United States Patent [19]

Brocke et al.

[11] Patent Number: 5,383,991
[45] Date of Patent: Jan. 24, 1995

[54] PROCESS FOR THE MANUFACTURE OF A RIGID COVER FOR A VEHICLE ROOF AND COVER MANUFACTURED ACCORDING TO THE PROCESS

[75] Inventors: Rolf Brocke, Wangen; Klaus Glagow, Wasserburg, both of Germany

[73] Assignee: Metzeler Automotive Profiles GmbH, Lindau/Bodensee, Germany

[21] Appl. No.: 213,117

[22] Filed: Mar. 14, 1994

[30] Foreign Application Priority Data

Mar. 15, 1993 [DE] Germany .............. 4308221

[51] Int. Cl.6 .................................... B65C 3/26
[52] U.S. Cl. ........................... 156/108; 296/216; 296/218
[58] Field of Search ............. 156/108; 296/216, 218

[56] References Cited

U.S. PATENT DOCUMENTS

| 4,738,482 | 4/1988 | Böhm et al. | 296/216 |
| 4,765,676 | 8/1988 | Grim et al. | 296/218 |
| 4,891,913 | 1/1990 | Shimura et al. | 296/216 |
| 5,050,928 | 9/1991 | Böhm et al. | 296/214 |
| 5,170,587 | 12/1992 | Nakatani et al. | 296/216 |

FOREIGN PATENT DOCUMENTS

| 0077219 | 4/1987 | Japan | 296/216 |
| 2191234 | 9/1989 | United Kingdom | 296/216 |

*Primary Examiner*—Michael W. Ball
*Assistant Examiner*—Sam Yao
*Attorney, Agent, or Firm*—Cumpston & Shaw

[57] ABSTRACT

Figure 2:
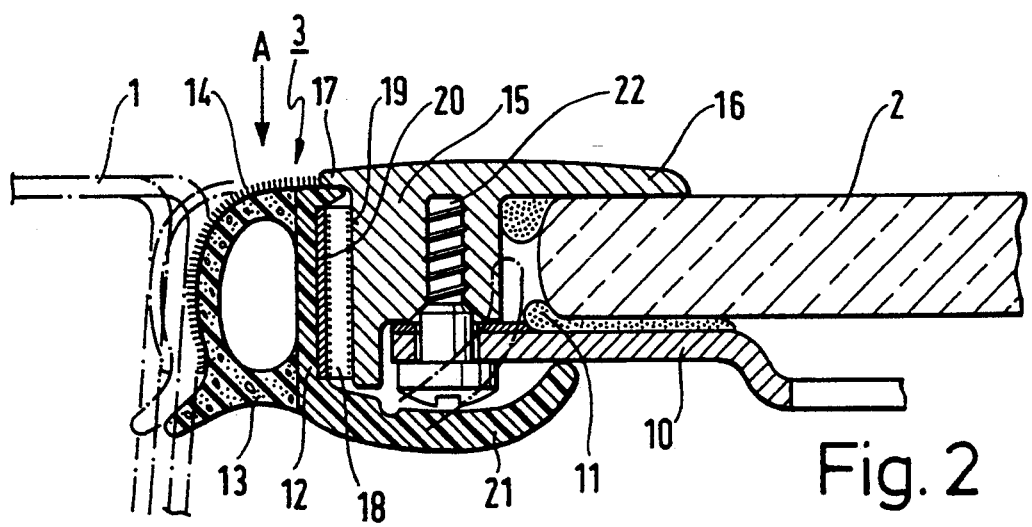

For easier manufacture and simpler assembly out of fewer individual components there is provided in this process for the manufacture of a rigid cover for a vehicle roof, with a peripheral seal opposite the roof opening and a glass panel glued to a base frame protruding out the side, on which frame is secured a peripheral, approximately T-shaped aluminum frame with a gap seal running between it and the roof opening, that the gap seal (3) be manufactured in the shape of a coextruded profile with an interior, vertically extending profile area (12) of an elastomer, and an exterior hollow chamber profile (13), made of sponge rubber and in the shape of a peripheral piece, which is connected to the exterior side (19) of the vertical leg of the T-shaped aluminum frame (15), after which this finished module is set on the protruding edge area of the other module, comprising glass panel (1) and base frame(10), and both modules are screwed together (FIG. 2 ).

11 Claims, 2 Drawing Sheets

PROCESS FOR THE MANUFACTURE OF A RIGID COVER FOR A VEHICLE ROOF AND COVER MANUFACTURED ACCORDING TO THE PROCESS

The invention relates to a process for the manufacture of a rigid cover for a vehicle roof, comprising a peripheral seal opposite the roof opening and a glass panel, which is glued to an underlying base frame, protruding out the side, in the rim area and on whose protruding edge is secured a peripheral, approximately T-shaped aluminum frame, which covers the edge of the glass panel with one free leg, and the gap seal to the roof opening with the other free leg.

A cover of this kind and a corresponding manufacturing process is known from DE-OS 36 39 894. The latter cover consists of many individual components, which must be put together in a complicated manner during the final assembly. Here the underlying interior frame features a vertically protruding rim, onto which is set the correspondingly shaped gap seal, which features metal inserts. A T-shaped aluminum profile is then overlaid on this seal and the glass panel, connected with the interior frame; after folding up a sealing lip of the gap seal which covers the securing holes, the T-shaped profile is then secured from below with inset screws. Consequently, several phases of operation and auxiliary devices are necessary to create a finished cover.

By contrast, the underlying objective of the present invention is to specify a process for the manufacture of such a cover, with which such a cover can be manufactured much more easily and particularly be assembled out of fewer individual components.

In order to achieve this objective in compliance with invention specifications the gap seal is manufactured in the shape of a coextruded profile with an interior, vertically extending profile area of an elastomer, and an exterior hollow chamber profile, made of sponge rubber and in the shape of a peripheral piece, which is connected to the outside of the vertical leg of the T-shaped aluminum frame, after which this finished module is set on the protruding edge area of the other module, comprising glass panel and base frame, and both modules are screwed together.

There are thus only two components for the assembly, namely the T-shaped aluminum frame with the gap seal on the one hand and the glass panel with the peripheral base frame on the other hand, which can then be joined together easily.

The elastomer area of the gap seal consists appropriately of EPDM with a Shore-A-Hardness of approximately 70.

With a cover manufactured according to this process a further development of the invention is provided in that the gap seal, connected to the T-shaped aluminum frame, which in turn is screwed onto the base frame, consists of two profile sections, where section A, with a tongue extruded onto the lower edge of the elastomer area and coveting the rim of the base frame in the area of the securing screws, extends over the front edge of the cover, and where section B, with a tongue projecting downward from the elastomer area, extends over the remaining area of the T-shaped aluminum frame.

Both these profile sections can then be glued together at their joining points.

In order to secure the gap seal it is possible that the gap seal is connected to the aluminum profile by means of a double-sided adhesive tape between the inner side of the elastomer area and the outer surface of the vertical leg of the T-shaped aluminum profile.

Here it is expedient if the elastomer area of the gap seal features an additional belt-shaped aluminum insert which prevents profile shrinkage.

However, it is also possible that the T-shaped aluminum frame comprises on its vertical outer surface a peripheral, undercut groove, and that the elastomer area comprises a corresponding, tongue-shaped protrusion to form a dove-tail connection, and that the T-shaped aluminum frame is equipped on its exterior lower edge with a ridge-shaped protrusion, encompassed by a curved protrusion of the elastomer area.

In this case a stabilizing aluminum belt, which features a lower curved clip for encompassing the ridge-shaped protrusion, should be extruded into the elastomer area.

A further possibility exists, in that the T-shaped aluminum frame features on its vertical exterior surface two peripheral, undercut grooves next to each other, and that the elastomer area features two corresponding, tongue-shaped protrusions, in order to form two dove-tail connections.

In order to connect the base frame and the T-shaped aluminum frame it is further possible that the T-shaped aluminum frame features instead of screw holes a vertical, peripheral stop-ridge with lateral grooves and that the base frame is connected to the T-shaped aluminum frame by means of clips, which interlock with the stop-ridge.

A further possibility for securing consists in that the T-shaped aluminum frame can feature instead of screw holes individual cylindrical, downward projecting pins, which penetrate the connection holes of the base frame and are border riveted after assembly.

Figure 1:
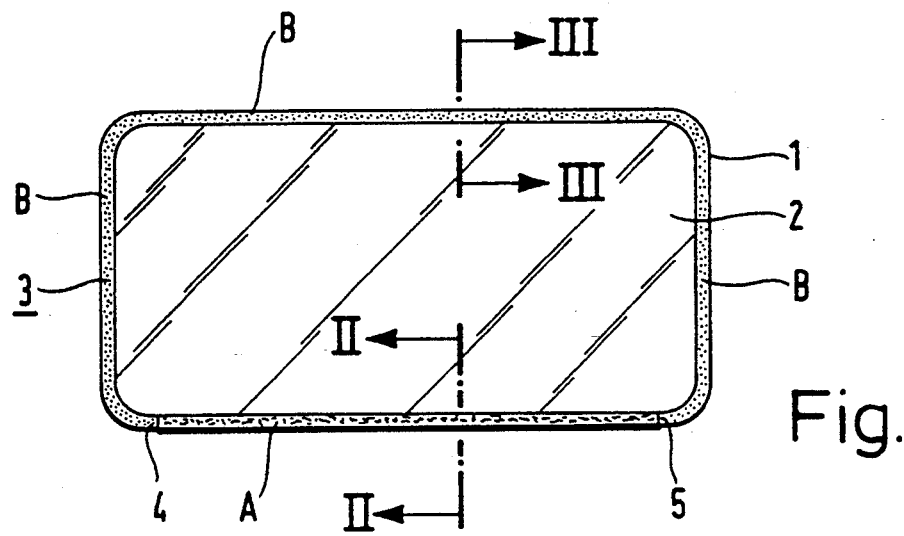

By means of a schematic diagram, the composition and manner of operation of embodiments of the invention are more clearly illustrated. Here is shown in:

FIG. 1 a top plan view of the cover within the roof opening,

FIG. 2 a longitudinal section of the edge area of the cover at its front edge with an adhered seal corresponding to section II—II in FIG. 1

Figure 3:
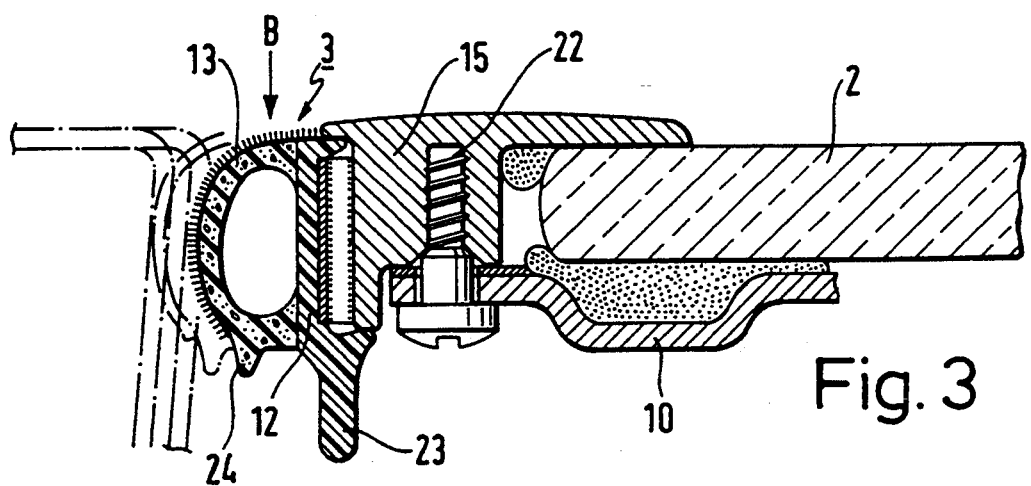
Figure 4:
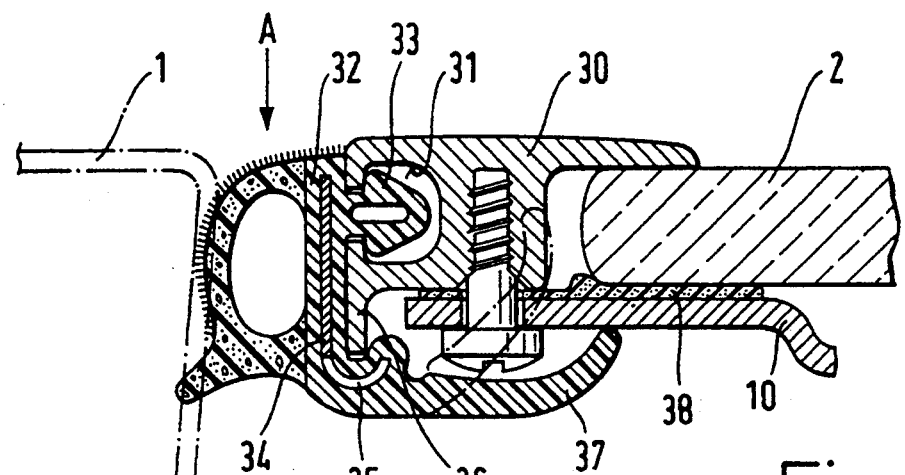
Figure 5:
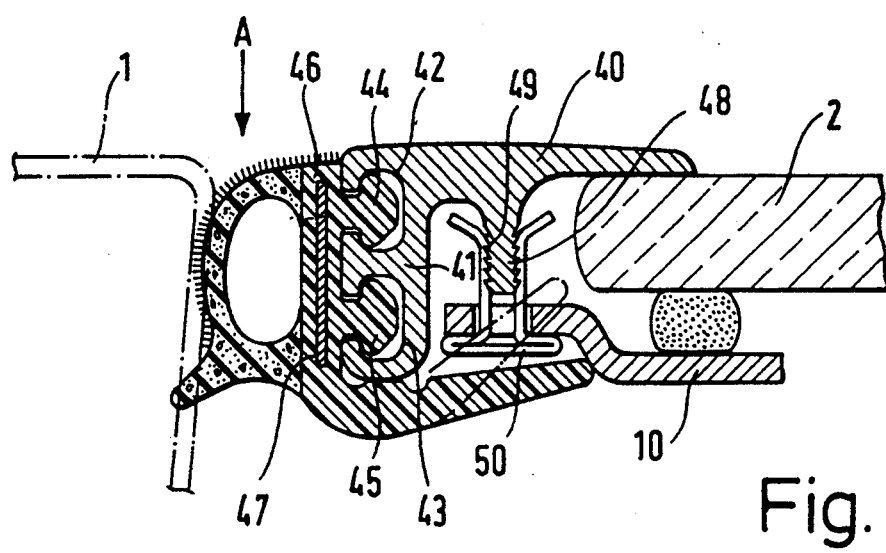
Figure 6:
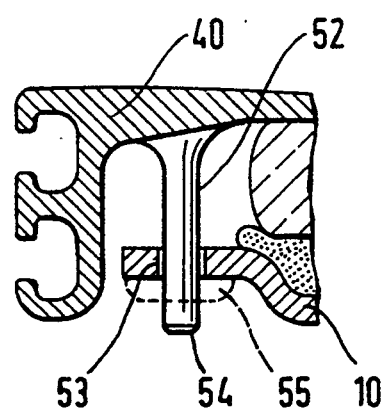

FIG. 3 a seal of the same kind as in FIG. 2 for the remaining peripheral areas of the cover corresponding to section III—III in FIG. 1, FIG. 4 a longitudinal section of the edge of the cover with a dove-tail-shaped fastening of the gap seal, FIG. 5 a longitudinal section of the edge area of the cover with a double dove-tail fastening of the gap seal and FIG. 6 a further variation for fastening the interior frame to the seal area.

According to the top plan view of a vehicle roof with a rectangular roof opening illustrated in FIG. 1, the cover which on the whole consists of a glass panel 2 is encompassed on all sides by a gap seal 3 to the roof opening. This gap seal 3 consists here of two different profile sections, namely profile section A on the front edge of the cover to be opened, and profile section B, which comprises the remaining areas of the cover 2. Here profile section A features two joining points 4, and 5 towards profile section B, at which points the two profile sections A and B are glued together.

FIG. 2 shows a cross-section of the edge area of the cover corresponding to section II—II in FIG. 1. According to this the glass panel 2 is connected with an underlying base frame 10, laterally protruding in the edge area, by means of an inserted adhesive 11.

The actual gap seal 3 of the profile section A consists of an interior vertically extending profile section 12 of an elastomer with a shore-a-hardness of approximately 70. A hollow chamber profile 13 made of sponge rubber is extruded to the exterior side of the elastomer area 12, whereby both parts can also be manufactured through coextrusion. The exterior surface of the hollow chamber profile 13 is then additionally provided with a coating 14 of polyester, which then seals against the roof opening 1.

Between profile section A and glass panel 2 there is further provided a peripheral aluminum frame, whose cross-section is approximately T-shaped and whose one free leg 16 covers the glass panel 2 and whose other leg 17 partially projects over the gap seal A. This gap seal A is now glued in between, and securely connected to, the interior side of the elastomer area 12 and the exterior surface 19 of the vertical leg of the T-shaped aluminum profile by means of a double-sided adhesive tape. To prevent a profile shrinkage in the elastomer area 12, an additional insert, made of an aluminum belt 20, can be provided here.

In addition, this profile area A features a lip 21, which projects horizontally backwards from the lower end of the elastomer area 12 and covers the protruding area of the base frame 10.

From the gap seal profile area A and the T-shaped aluminum profile there results consequently a single-piece module, which can then be set onto the protruding edge of the base frame 10 and be connected to the same by corresponding screws 22.

Thus there results a rigid cover, which is prefabricated to the extent that only two modules need be connected in the final assembly: one consisting of glass panel 2 and base frame 10, and another consisting of the T-shaped aluminum profile 15 and the gap seal 3.

FIG. 3 shows a cross-section of profile section B of the remaining seal area, corresponding to section III-—III in FIG. 1. Here profile section B of the gap seal 3 is designed according to the same principle as in FIG. 2. Only the lip 21, which covers the protruding area of the base frame 10, is left out and replaced by a downward projecting tongue 23. The sponge rubber seal can also be slightly changed and be designed with a downward projecting sealing lip 24.

A further design and connection possibility of the profile section A with the T-shaped aluminum profile 30 can be seen in FIG. 4. According to this, the aluminum frame 30 features on its vertical exterior surface a peripheral, undercut groove 31, while a corresponding, tongue-shaped protrusion 33 projects away from the elastomer area of the profile section A. This protrusion 33 fits exactly into the groove 31 and forms a dove-tail connection with it. In addition there is vulcanized into the elastomer area 32 a stabilizing aluminum belt 34, which features a flexed clip-shaped protrusion 36 at its lower end, which in turn encompasses a ridge-shaped protrusion 36 on the exterior lower edge of the aluminum profile 30.

For this profile section there is also provided at the bottom of the elastomer area 32 a sealing lip 37, which extends horizontally to the frame 10, but which is excluded from the corresponding profile areas B and instead of which there is provided a downward projecting sealing lip corresponding to lip 23 in FIG. 3.

Instead of gluing together glass panel 1 and frame 10, a sponge rubber insert 38 can be inserted, which can be glued to both parts or simply laid in.

Another connection possibility is illustrated in FIG. 5. Here the T-shaped aluminum frame 40 features a vertical ridge on the side facing the gap seal section A; into this ridge are notched two peripheral undercut grooves 42 and 43, into which project two corresponding tongue-shaped protrusions 44 and 45 from profile section A, and thereby form two dove-tail connections. Here, as well, there can be vulcanized into the elastomer area 46 a stabilizing aluminum belt 47.

The fastening of base frame 10 to aluminum frame 40 is here achieved in a different manner. The aluminum frame 10 here features instead of screw holes a vertical peripheral stop-ridge 48 with lateral grooves 49, whereby base frame 10 and aluminum frame 40 are then connected with, and tightened against each other by means of the clips 50, and inserted into the corresponding drill holes in the base frame 10.

A further connection possibility is illustrated in FIG. 6. Here the T-shaped aluminum frame 40 features instead of screw holes individual cylindrical, downward projecting pins 52, whose protrusion 54 projects through the connection holes 53 of the base frame 10. After assembly of the two modules this protrusion is then border-riveted, so that a rivet head 55 results, which also guarantees a secure fastening of the two modules.

Thus there results altogether—as is shown in the different embodiments—a rigid cover for a roof opening, which can easily be assembled into a finished cover from only two pre-fabricated modules.

What is claimed is:

1. Process for the manufacture of a rigid cover for a vehicle roof, with a peripheral seal opposite the roof opening and a glass panel, which is glued to an underlain base frame, protruding out the side, in the rim area and on whose protruding edge is secured a peripheral, approximately T-shaped aluminum frame, which covers the edge of the glass panel with one free leg, and the gap seal to the roof opening with the other free leg, characterized in that the gap seal (3) is manufactured in the shape of a coextruded profile with an interior, vertically extending profile area (12; 32; 46) of an elastomer, and an exterior hollow chamber profile (13), made of sponge rubber and in the shape of a peripheral piece, which is connected to the exterior side of the vertical leg of the T-shaped aluminum frame (15; 30; 40), after which this finished module is set on the protruding edge area of the other module, comprising glass panel (1) and base frame (10), and both modules are screwed together.

2. Process according to claim 1, characterized in that the elastomer area is manufactured from EPDM with a Shore-A-Hardness of approximately 70.

3. Cover manufactured according to the process in claim 1, characterized in that the gap seal (3), connected to the T-shaped aluminum frame (15; 30; 40), which in turn is screwed onto the base frame (10), consists of two profile sections (A, B), where section A, with a tongue (21; 37) extruded onto the lower edge of the elastomer area (12; 32; 46) and covering the rim of the base frame (10) in the area of the securing screws (22), extends over the front edge of the cover (1), and where section B, with a tongue (23) projecting downward from the elastomer area (12; 32; 46), extends over the remaining area of the T-shaped aluminum frame (15; 30; 40).

4. Cover according to claim 3, characterized in that both these profile sections (A, B) can then be glued together at their joining points (4; 5).

5. Cover according to claim 3, characterized in that the gap seal (3) is connected to the aluminum profile (15) by means of a double-sided adhesive tape (18) between the inner side of the elastomer area (12) and the outer surface (19) of the vertical leg of the T-shaped aluminum profile (15).

6. Cover according to claim 5 characterized in that the elastomer area (12) of the gap seal (3) features an additional aluminum insert (20) which prevents profile shrinkage.

7. Cover according to claim 3, characterized in that the T-shaped aluminum frame (30) comprises on its vertical outer surface a peripheral, undercut groove (31), and that the elastomer area (32) comprises a corresponding, tongue-shaped protrusion (33) to form a dove-tail connection, and that the T-shaped aluminum frame (30) is equipped on its exterior lower edge with a ridge-shaped protrusion (36), encompassed by a curved protrusion (35) of the elastomer area (32).

8. Cover according to claim 7, characterized in that a stabilizing aluminum belt (34), which features a lower, notched, curved clip (35) for encompassing the ridge-shaped protrusion (36), is extruded into the elastomer area (32).

9. Cover according to claim 3, characterized in that the T-shaped aluminum frame (40) features on its vertical exterior surface two peripheral, undercut grooves (42; 43) next to each other, and that the elastomer area (46) features two corresponding, tongue-shaped protrusions (44; 45) to form two dove-tail connections.

10. Cover according to claim 9, characterized in that the T-shaped aluminum frame (40) features instead of screw holes a vertical, peripheral stop-ridge (48) with lateral grooves (49), and that the base frame (10) is connected to the T-shaped aluminum frame (40) by means of clips (50), which interlock with the stop-ridge (48).

11. Cover according to claim 10, characterized in that the T-shaped aluminum frame (40) features instead of screw holes individual cylindrical, downward projecting pins (52), which penetrate the connection holes (53) of the base frame (10) and are border riveted (55) after assembly.

* * * * *